(12) United States Patent
Shen

(10) Patent No.: US 8,589,692 B2
(45) Date of Patent: Nov. 19, 2013

(54) METHOD AND APPARATUS FOR VERIFYING CGA SIGNATURE

(75) Inventor: Shuo Shen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 167 days.

(21) Appl. No.: 13/091,343

(22) Filed: Apr. 21, 2011

(65) Prior Publication Data

US 2011/0197072 A1    Aug. 11, 2011

Related U.S. Application Data

(63) Continuation of application No. PCT/CN2009/072609, filed on Jul. 3, 2009.

(30) Foreign Application Priority Data

Oct. 21, 2008    (CN) .......................... 2008 1 0217096

(51) Int. Cl.
    *H04L 9/32* (2006.01)
(52) U.S. Cl.
    USPC ........... 713/176; 713/168; 380/287; 709/248; 705/7.11; 705/7.42; 717/100; 717/167
(58) Field of Classification Search
    USPC ......... 713/176, 168; 705/7.11–7.42; 709/248; 380/287; 726/1–36; 717/100–167
    See application file for complete search history.

(56) References Cited

U.S. PATENT DOCUMENTS

| 5,497,422 | A | * | 3/1996 | Tysen et al. | 713/157 |
| 7,496,347 | B2 | * | 2/2009 | Puranik | 455/410 |
| 7,885,274 | B2 | * | 2/2011 | Thubert | 370/401 |
| 8,098,823 | B2 | * | 1/2012 | Kempf et al. | 380/277 |
| 2005/0262354 | A1 | * | 11/2005 | Komano | 713/177 |
| 2007/0113075 | A1 | * | 5/2007 | Jo et al. | 713/158 |

(Continued)

FOREIGN PATENT DOCUMENTS

| CN | 101162999 A | 4/2008 |
| EP | 1560361 A1 | 8/2005 |
| WO | WO 2007/067475 A1 | 6/2007 |

OTHER PUBLICATIONS

T. Aura, Network Working Group-RFC 3972 Cryptographically Generated Addresses, Mar. 2005, Microsoft research, 1-23.*

(Continued)

*Primary Examiner* — Christopher Brown
*Assistant Examiner* — Fahimeh Mohammadi
(74) *Attorney, Agent, or Firm* — Leydig, Voit & Mayer, Ltd.

(57) ABSTRACT

A method and apparatuses for verifying Cryptographically Generated Address (CGA) signature are provided. The method includes: receiving a message sent by a CGA address owner, wherein a RSA public key, a first RSA public key signature, a second public key, and a second public key signature are carried in the message, the first RSA public key binds one or more second public keys, and a part protected by the first public key signature includes the one or more second public keys; verifying the first RSA public key signature according to the message; extracting the second public key, and verifying the second public key signature. According to the method and apparatuses of the embodiment, the effect of supporting other public key can be achieved, the change of the IP address can be omitted, and public key deployment and computing resources are saved.

8 Claims, 2 Drawing Sheets

(56) References Cited

U.S. PATENT DOCUMENTS

2008/0137659 A1* 6/2008 Levy-Abegnoli et al. .... 370/392
2008/0155260 A1* 6/2008 Perez et al. ................... 713/169
2008/0304457 A1* 12/2008 Thubert et al. ................ 370/338

OTHER PUBLICATIONS

First Office Action of related Chinese Application No. 200810217096.1, dated Sep. 8, 2011.
Written Opinion of the International Searching Authority issued in related PCT/CN2009/072609 dated Oct. 15, 2009.
Cheneau et al., "Comments on draft-shen-csi-ecc," Internet Engineer Task Force, Jul. 8, 2008, The Internet Society, Reston, Virginia.
International Search Report from the Chinese Patent Office for International Application No. PCT/CN2009/072609, mailed Oct. 15, 2009.
Adams, A. et al., "Protocol Independent Multicast—Dense Mode (PIM-DM): Protocol Specification (Revised)," Network Working Group, Request for Comments: 3973, Category: Experimental, RFC3973, pp. 1-17, (2005).
Shen, S. et al., "ECC Support for SEND/CGA Draft-Shen-CSI-ECC-01.TXT)," CSI Working Group Internet-Draft, Intended Staus; Informational, Expires; Apr. 14, 2009, pp. 1-13, (2008).
Aura, T., "Cryptographically Generated Addresses (CGA)," Network Working Group, Request for Comments: 3972, Research Category: Standards Track, Mar. 2005, pp. 1-62, (2004).
Extended European Search Report in corresponding European Patent Application No. 09821525.4 (Nov. 13, 2012).
Aura, T., "RFC-3972—Cryptographically Generated Addresses (CGA)," Standards Track, Mar. 2005, The Internet Society, Reston, Virginia.

* cited by examiner

A CGA owner sends a Message, in which an original RSA public key, an RSA public key signature, a new public key, and a new public key signature are carried. — S1

A receiver verifies the CGA address and the RSA public key signature according to the packet, extracts the new public key, and verifies the new public key signature. — S2

METHOD AND APPARATUS FOR VERIFYING CGA SIGNATURE

CROSS-REFERENCE TO RELATED APPLICATIONS

This application is a continuation of International Application No. PCT/CN2009/072609, filed on Jul. 3, 2009, which claims priority to Chinese Patent Application No. 200810217096.1, filed on Oct. 21, 2008, both of which are hereby incorporated by reference in their entireties.

FIELD OF THE INVENTION

The present invention relates to the field of communications, and in particular, to a method and apparatus for verifying Cryptographically Generated Address (CGA) signature.

BACKGROUND OF THE INVENTION

The Cryptographically Generated Address (CGA) is a kind of special IPv6 address, in which the interface identifier is generated according to a public key in combination and auxiliary information by using a unidirectional encryption hash algorithm. In the use of the CGA, a receiver needs to recompute a hash value, and compares the hash value with interface identifier in an address of a sender to verify a binding relation between the public key of the sender and the address of the sender. Protection to a network message may be achieved by attaching the public key and the auxiliary information to the message, and then signing the message by using a corresponding private key. The CGA solution solves an authentication problem of the address within the IP layer, and does not need other authoritative certificate systems or other secure architectures; therefore, the CGA solution is a simple and effective security solution.

As the CGA binds the public key/private key of an address owner, the address owner may sign a message sent by the address owner by using the private key of this public/private key system, so as to achieve a purposes of authenticating the source of the message and protecting the integrity of the message. A receiver, i.e. a verifier, must verify the CGA and the signature; if any one of the verifications of the CGA and the signature is not matched, the verification process fails and the corresponding address and message are not reliable.

The existing CGA protocol is specified that only a Ron-Shamir-Adleman (RSA) public key, which is a public key system invented by Ron-Shamir-Adleman, and may be used for signing in the network communication to achieve a purpose of authentication, is supported due to incomplete consideration when the CGA is designed as well as a purpose of implementing the protocol simply and feasible. Since the requirement of the network communication security on key strength has been enhanced, the length of the RSA key increasingly becomes a shackle of use of the CGA. At present, the commonly used 1024 bits RSA key has 128 bytes, and the industry-accepted 1024 bits RSA key is regarded to be insecure in 2010; therefore, the key with more bits becomes a mandatory requirement. However, overlong keys bring burdens to computing, storing, and communicating. Especially for a large number of mobile and portable terminal equipment and sensors, as the limitations of computing capability and storage capability, the key is required to be as short as possible with the same security strength.

In a conventional technology that the CGA binds a number of public keys, the public keys, which may include other public key other than the RSA, are bound when the CGA address is generated. However, when the technology is implemented, the original deployment of CGA addresses and the public key must be updated to generate and deploy new CGA address and related public key. The solution is not advisable under a condition that a user does not want to change the original deployment of IP address and the public key.

SUMMARY OF THE INVENTION

Embodiments of the present invention provide a method and apparatus for verifying CGA signature, so as to solve the problem that at present when a number of public keys are bound in a network deployed with the CGA, the original deployment of CGA address and public key must be updated to generate and deploy new CGA address and related public key.

An embodiment of the present invention provides a method for verifying CGA signature, where the method includes:

receiving a message sent by a CGA address owner, where a first RSA public key, a first RSA public key signature, a second public key, and a second public key signature are carried, wherein the first RSA public key binds one or more second public keys, and a part protected by the first RSA public key signature includes the one or more second public keys; and verifying the first RSA public key signature according to the message, extracting the second public key, and verifying the second public key signature.

Another embodiment of the present invention provides an apparatus for verifying CGA signature, where the apparatus includes:

a signature module, configured to add a first RSA public key, a first RSA public key signature, a second public key, and a second public key signature to a message to be sent, where the first RSA public key binds one or more second public keys, and a part protected by the first RSA public key signature includes the one or more second public keys; and a sending module, configured to send the message.

Still another embodiment of the present invention provides an apparatus for verifying CGA signature, where the apparatus includes:

a receiving module, configured to receive a message sent by a CGA address owner, where a first RSA public key, a first RSA public key signature, a second public key, and a second RSA public key signature are carried, wherein the first RSA public key binds one or more second public keys, and a part protected by the first RSA public key includes the one or more second public keys; and a verifying module, configured to verify the first RSA public key signature according to the message, extract the second public key, and verify the second public key signature.

According to the method and apparatus of the embodiments of the present invention, IP address does not need to be changed, and the public key does not need to be redeployed in both communication parties in the existing CGA which is based on an RSA public key system, therefore the effect of supporting other public key can be achieved, the change of the IP address can be omitted, and public key deployment and computing resources are saved.

DETAILED DESCRIPTION OF THE EMBODIMENTS

The implementation process of the present invention is described with reference to specific embodiments in the following.

Figures 1, 2:
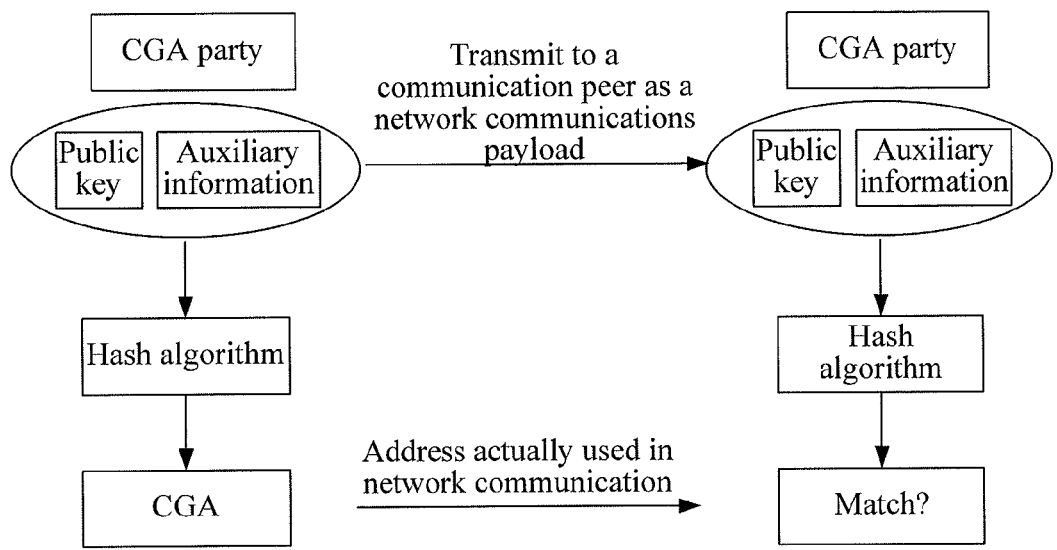
FIG. 1 is schematic diagram of verifying CGA.
FIG. 2 is a flow chart of a method for verifying CGA signature according to an embodiment of the present invention.

The generation, verification, and signature of a CGA are defined in the Request for Comments (RFC) 3972. As shown in FIG. 1, an interface identifier of the CGA is generated according to a public key of a CGA party and auxiliary information by using a hash algorithm, and the CGA is transmitted to a communication peer as a network communication payload. A verifier, such as a receiver, obtains the public key of the CGA party and the auxiliary information through communication, performs computation by using the hash algorithm, and then compares with the CGA actually used in the communication for verification. The above explanations and FIG. 1 are only simple demonstrations of the CGA. The CGA in actual application is more complicated, and employs technologies such as using hash algorithm twice and security parameters for better security, and for detailed explanations, reference can be made to the RFC3972.

The Elliptic Curve Cryptography (ECC) is a new public key system, and may be used to achieve an authentication purpose in network communication. With the advanced theoretical basis, the public key system has a characteristic of a shorter key compared with an RSA public key system. For example, under the same security strength, approximately 160 bits ECC key equals 1024 bits RSA key in terms of security.

In an embodiment of a method for verifying CGA signature in the present invention, the ECC public key does not need to be deployed beforehand, but is on the basis of the deployed RSA to trust the new ECC public key; therefore, the RSA public key binds the ECC public key, a part protected by RSA public key signature includes the ECC public key, so as to use new ECC public key and public key signature when the message is transmitted, thereby reducing the verification complexity.

Referring to FIG. 2, a method for verifying CGA signature according to an embodiment of the present invention is provided.

In block S1, a CGA owner sends a message, in which an original RSA public key, an RSA public key signature, a new public key, and a new public key signature are carried.

In the situation that the RSA public key is deployed in a previous version of SEcure Neighbor Discovery (SEND) &CGA algorithm, if a user expects to use an ECC public key, at this time, the CGA owner, such as Alice, maintains the original CGA address and the bound RSA public/private key pair of the original CGA address in view of high complexity of generation of the CGA and inconvenience of updated IP address.

The original RSA public key, the new public key, the RSA public key signature, and the new public key signature are carried in the message sent by Alice. The new public key may be the ECC public key, or other new public key, or another RSA public key or other public key. The new public key signature may be an ECC public key signature or other public key signature. The new public key may be protected by RSA public key signature. The original RSA public key may bind one or more new public keys, a part protected by the original RSA public key signature includes the one or more new public keys, that is, the original RSA public key owner trusts the one or more new public keys.

An interface identifier of the CGA is generated according to the public key of the CGA address owner and auxiliary information by using a hash algorithm, and is transmitted to a communication peer, that is a receiver, as a network communication payload.

In block S2, the receiver verifies the CGA address and the RSA public key signature according to the message, extracts the new public key, and verifies the new public key signature.

A verifier (for example, a receiver, Bob) obtains a public key of the CGA address owner and the auxiliary information through communication, performs computation by using the hash algorithm, and then compares with the CGA address actually used in the communication for verification.

The receiver Bob verifies not only the CGA address but also the RSA public key signature of Alice, extracts the ECC public key (or other new public key), and verifies the ECC public key signature (or other new public key signature).

In specific implementation, the users Alice and Bob deploy CGA and the bound 1024 bits RSA public key of the CGA. Alice enables the RSA key to bind the new ECC public key, of which security strength is equivalent to the security strength required by the user, such as 160 bits, through the above binding mechanism. Through the new binding, Alice may use the ECC public key having fewer bits to perform the message protection described in the method for verifying CGA signature of the embodiment. In this scenario, the purpose of using the new ECC public key without changing the original CGA address may be achieved.

According to the method of the embodiment in the present invention, IP address does not need to be changed, the public key does not need to be redeployed in both communication parties in the existing CGA which is based on an RSA public key system, therefore the effect of supporting the ECC public key (or other public key) can be achieved, the change of IP address can be omitted, and public key deployment and computing resources are saved.

Figure 3:
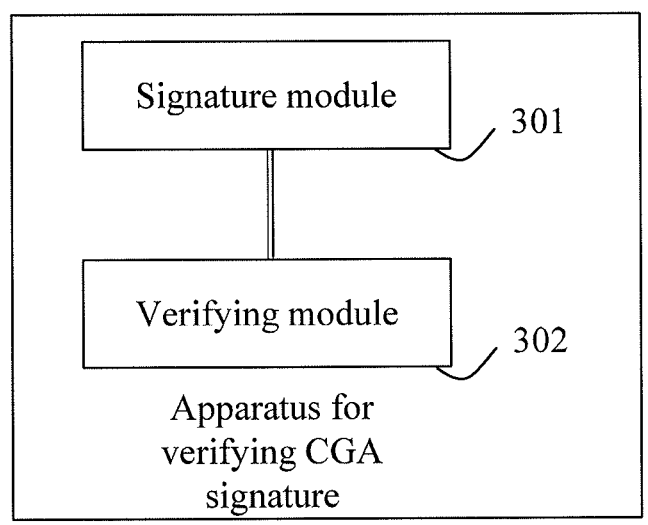
FIG. 3 is a structural block diagram of an apparatus for verifying CGA signature according to an embodiment of the present invention.

Referring to FIG. 3, an apparatus for verifying CGA signature according to an embodiment of the present invention includes a signature module and a verifying module.

The signature module is configured to add a first RSA public key, a first RSA public key signature, a second public key, and a second public key signature to a message to be sent.

The verifying module is configured to verify CGA address and the first RSA public key signature according to the message, extract the second public key, and verify the second public key signature.

The second public key is an RSA public key, and the corresponding second public key signature is an RSA public key signature. Alternatively, the second public key is an ECC public key, and the corresponding second public key signature is an ECC public key signature.

The original RSA public key may bind one or more new public keys, a part protected by the original RSA public key signature includes the one or more new public keys, that is, the original RSA public key owner trusts the one or more new public keys.

The signature module is disposed in a sender, and the verifying module is disposed in a receiver or a third party apparatus.

The using process of the apparatus for verifying CGA signature is similar to the foregoing embodiment, and therefore, the details will not be described herein again.

According to the apparatus for verifying CGA signature of the embodiment in the present invention, IP address does not need to be changed, the public key does not need to be redeployed in both communication parties in the existing CGA which is based on an RSA public key system, therefore the effect of supporting the ECC public key (or other public keys) can be achieved, the change of IP address can be omitted, and public key deployment and computing resources are saved.

Through the above description of the implementation, it is clear to persons skilled in the art that the embodiments of the present invention may be accomplished through hardware, or through software plus a necessary universal hardware platform. But in many cases, the latter implementation is preferred. Based on this, the above technical solutions or the part that makes contributions to the prior art can be substantially embodied in the form of a software product. The computer software product may be stored in a storage medium, and contain several instructions to instruct computer equipment (for example, a personal computer, a server, or network equipment) to perform the method described in the embodiments of the present invention.

The above descriptions are merely some exemplary embodiments of the present invention, but the protection scope of the present invention is not limited to these embodiments. Any modification, equivalent replacement, or improvement made by persons skilled in the art without departing from the principle of the present invention should fall within the protection scope of the present invention. Therefore, the protection scope of the present invention is subject to the protection scope of the claims.

What is claimed is:

1. A method for verifying Cryptographically Generated Address (CGA) signature, comprising:
    receiving, by a receiver, a message sent by a CGA owner, wherein a first Ron-Shamir-Adleman (RSA) public key, a first RSA public key signature, a second public key, and a second public key signature are carried in the message, the first RSA public key binds one or more second public keys, and a part of the message includes the one or more second public keys, wherein the part of the message is protected by the first RSA public key signature, wherein the second public key is an Elliptic Curve Cryptography (ECC) public key, and the corresponding second public key signature is an ECC public key signature; and
    verifying, by the receiver, the first RSA public key signature according to the message; extracting the second public key, and verifying the second public key signature.

2. The method according to claim 1, wherein a CGA interface identifier, which is generated according to a public key of the CGA owner and auxiliary information by using a hash algorithm, is carried in the message.

3. The method according to claim 2, further comprising:
    verifying, by the receiver, the CGA according to the CGA interface identifier carried in the message.

4. The method according to claim 3, wherein the verifying the CGA according to the CGA interface identifier carried in the message comprises:
    obtaining, by the receiver, the public key of the CGA owner and the auxiliary information by communicating with the CGA owner;
    computing, by the receiver, another CGA interface identifier according to the public key of the CGA owner and the auxiliary information by using the hash algorithm; and
    verifying, by the receiver, the CGA by comparing the computed CGA interface identifier and the CGA interface identifier contained in the message.

5. A computer-readable storage device, wherein the device stores instructions that may be executed to:
    add a first Ron-Shamir-Adleman (RSA) public key, a first RSA public key signature, a second public key, and a second public key signature to a message to be sent from a CGA owner, wherein the first RSA public key binds one or more second public keys, and a part of the message comprises the one or more second public keys, wherein the part of the message is protected by the first RSA public key signature, wherein the second public key is an Elliptic Curve Cryptography (ECC) public key, and the corresponding second public key signature is an ECC public key signature; and
    send the message from the CGA owner, wherein the CGA owner adds the first RSA public key, the first RSA public key signature, the second public key, and the second public key signature to the message.

6. A computer-readable storage device, wherein the device stores a set of instructions that may be executed to:
    receive a message sent by a CGA owner, wherein a first Ron-Shamir-Adleman (RSA) public key, a first RSA public key signature, a second public key, and a second public key signature are carried in the message, the first RSA public key binds one or more second public keys, and a part of the message includes the one or more second public keys, wherein the part of the message is protected by the first RSA public key signature, wherein the second public key is an Elliptic Curve Cryptography (ECC) public key, and the corresponding second public key signature is an ECC public key signature; and
    verify the first RSA public key signature according to the message, extract the second public key, and verify the second public key signature.

7. The computer-readable storage device apparatus according to claim 6, wherein a CGA interface identifier, which is generated according to the public key of the CGA owner and auxiliary information by using a hash algorithm, is carried in the message.

8. The computer-readable storage device according to claim 7, wherein the device further stores instructions that may be executed to verify the CGA according to the CGA interface identifier carried in the message.

* * * * *